(12) United States Patent
Bruce

(10) Patent No.: US 7,992,651 B2
(45) Date of Patent: *Aug. 9, 2011

(54) WAVY DISC AND COULTER WITH NOTCHES

(76) Inventor: Douglas G. Bruce, Perry, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,595

(22) Filed: Jan. 4, 2010

(65) Prior Publication Data

US 2011/0162856 A1 Jul. 7, 2011

(51) Int. Cl.
*A01B 59/00* (2006.01)
(52) U.S. Cl. ........................................ 172/604; 111/166
(58) Field of Classification Search .................. 172/531, 172/532, 537, 539, 540, 555, 603, 604, 765; 111/63, 66; D15/29; 301/63, 101, 63.101
See application file for complete search history.

(56) References Cited

U.S. PATENT DOCUMENTS

| | | | | |
|---|---|---|---|---|
| 395,638 | A | * | 1/1889 | Stuart ............................ 172/153 |
| 2,575,321 | A | | 11/1951 | Traver |
| 3,734,197 | A | | 5/1973 | Zehrung |
| 4,538,688 | A | * | 9/1985 | Szucs et al. .................... 172/555 |
| 4,545,438 | A | | 10/1985 | Giovanni |
| 5,473,999 | A | | 12/1995 | Rawson |
| 5,649,602 | A | | 7/1997 | Bruce |
| 6,186,245 | B1 | | 2/2001 | Skjaeveland |
| 6,554,079 | B2 | | 4/2003 | Bruce |
| 6,668,532 | B2 | | 12/2003 | Krone |
| 7,497,270 | B2 | | 3/2009 | Bruce |
| 2002/0038620 | A1 | * | 4/2002 | Gentilhomme ............... 111/166 |
| 2003/0201108 | A1 | | 10/2003 | Linden |

OTHER PUBLICATIONS 17-pg. catalog entitled Original Equipment Manufacturer (OEM) Catalogue, USA.

* cited by examiner

*Primary Examiner* — Robert E Pezzuto
*Assistant Examiner* — Jamie L McGowan
(74) *Attorney, Agent, or Firm* — Sturm & Fix LLP

(57) ABSTRACT

A wavy disc and coulter with notches and method of using same, the disc or coulter having plurality of waves formed in the blade by deviating the entire outer periphery of the variable wave coulter from a flat plane. A plurality of crests and a plurality of valleys are formed in the blade, wherein each of said plurality of waves comprises a first and a second crest and one valley between the first and second crests at the outer periphery thereof. A notch is disposed in each respective wave on the outer periphery of the blade and wherein at least a majority of the notch is disposed between the first one of the respective crests and the respective valley, such majority of the notch being closer to the first respective crest than to the second respective crest.

7 Claims, 7 Drawing Sheets

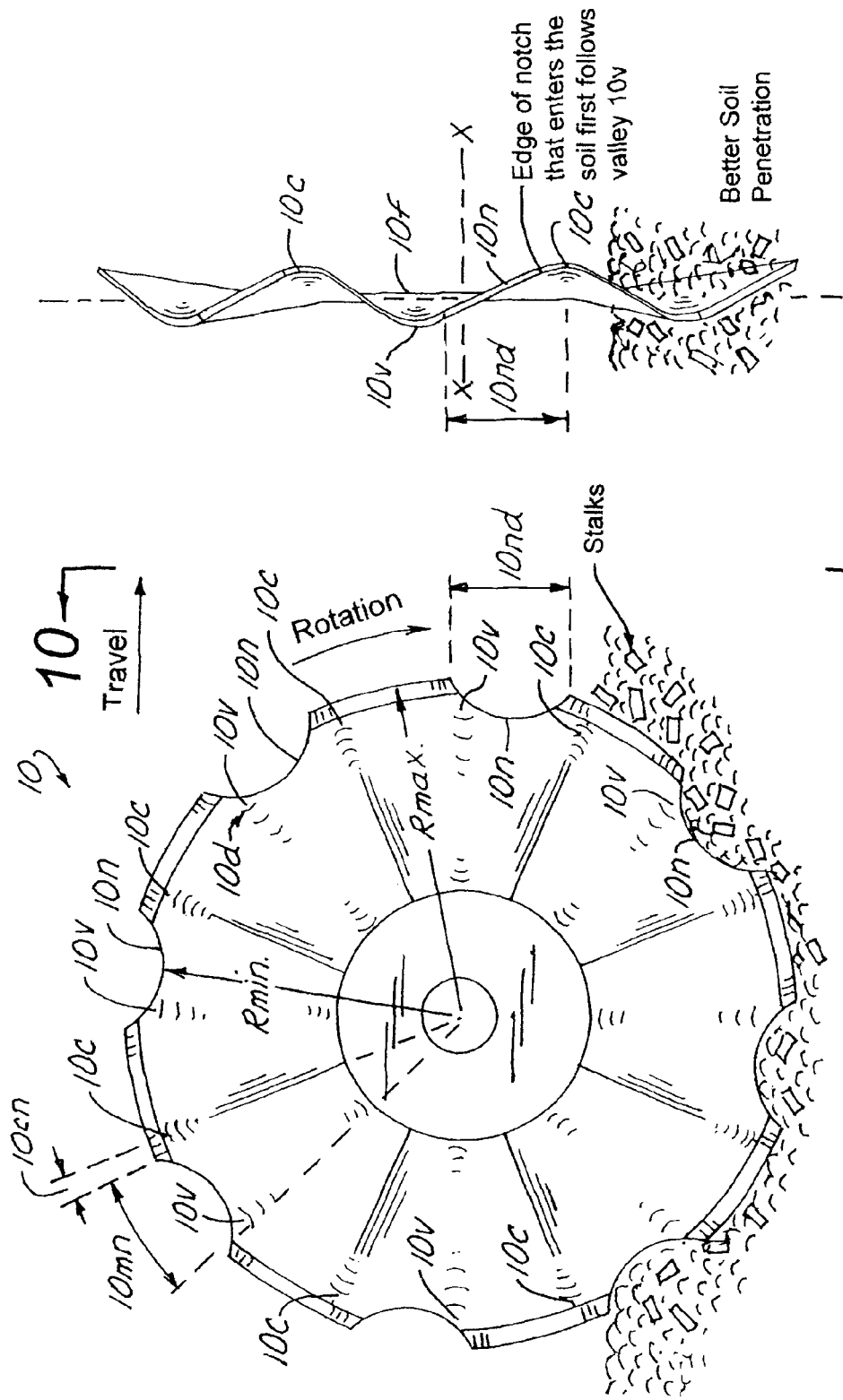

WAVY DISC AND COULTER WITH NOTCHES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to tillage tools and more particularly to a new wavy disc and coulter.

2. Background of the Invention

Wavy coulters are presently used ahead of no-till implements, such as a planter, to fracture a narrow band of soil to prepare the soil to receive the no-till implement, for example as shown in U.S. Pat. No. 5,473,999 to Rawson, which is incorporated herein by reference in its entirety. The coulters are set at a penetrating depth of about four inches, and the amplitude of the wave from crest-to-valley is about one to two inches and generally defines the width of the band. All crests and all valleys deviate from a single plane by the same amount. These traditional wavy coulters are designed for only one speed, and if they go faster they throw great amounts of dirt.

The crests and valleys on presently available wavy coulters are positioned to extend out from the center of the coulter in a line generally coincident with the radius of the coulter. As each wave enters the soil, the line of the wave enters the soil at an angle with respect to vertical.

A wavy coulter was disclosed in U.S. Pat. No. 5,649,602, which patent is incorporated herein by reference in its entirety. In U.S. Pat. No. 5,649,602, the waves of the coulter extend back from the peripheral edge of the coulter in respective adjacent lines disposed at a predetermined acute angle with respect to the radius of the coulter body. The maximum amplitudes of all the periodic deviations from flat are equal. It has been shown, however, that varying the maximum amplitudes of the periodic deviations from flat provides advantages over this prior art.

Herein, deviation from flat is defined by a distance from a plane in which the periphery of a flat coulter resides.

Discs are similar to coulters except they have a convex shape on one side and a concave shape on the other side thereof for the purpose of throwing dirt in a direction from the convex to the concave side. Discs usually do not have a wavy configuration but often do have notches formed in the outer periphery thereof, for example like U.S. Pat. No. 6,554,079 to Bruce and the prior art shown therein, all of which are incorporated herein by reference in their entirety.

BRIEF SUMMARY OF THE INVENTION

The present invention relates to a tillage blade which can be a coulter or a disc, the blade being disposed about a rotational axis and having an outer periphery disposed radially outwardly from the rotational axis. A plurality of waves are formed in the blade by deviating the entire outer periphery of the variable wave coulter from a flat plane. A plurality of crests and a plurality of valleys are formed in the blade, wherein each of said plurality of waves comprises a first and a second crest and one valley between the first and second crests at the outer periphery thereof. The waves have a plurality of distinct amplitudes, wherein at least one of said plurality of waves exhibits a maximum deviation of each of the plurality of distinct amplitudes from the flat plane at the outer periphery thereof. A notch is disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest.

BRIEF DESCRIPTION OF THE SEVERAL VIEWS OF THE DRAWINGS

FIG. 9 is a side elevational view of one side of the tillage blade shown in FIG. 1 in use tilling the soil by pulling it through the soil in one direction which provides better soil penetration than if it was pulled through the soil in an opposite direction;

FIG. 10 is an end view taken along line 10-10 of the blade of FIG. 9 in use;

DETAILED DESCRIPTION OF THE INVENTION

Figure 1:
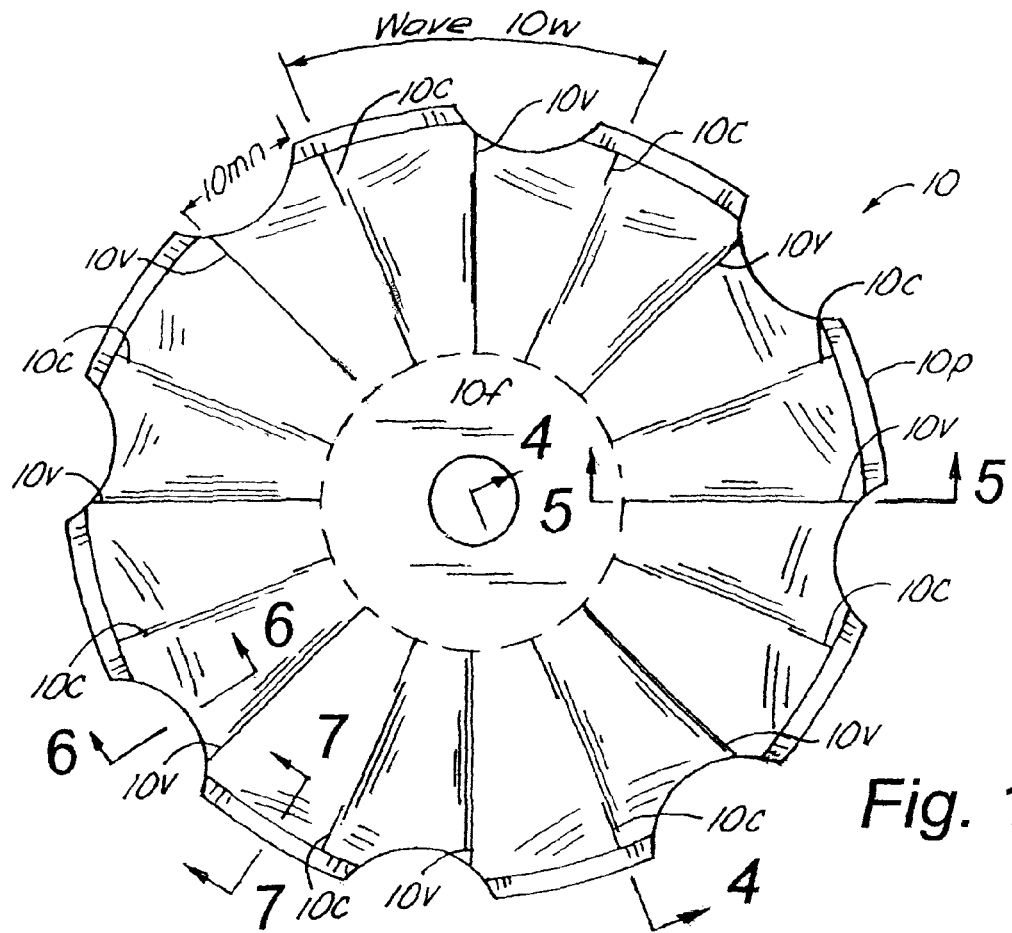
FIG. 1 is a side elevational view of one side of a coulter tillage blade constructed in accordance with the present invention.

Referring now to the drawings, wherein like reference numerals designate identical or corresponding parts throughout the several views, FIG. 1 shows a tillage blade (10) which can be a coulter or a disc, the blade (10) being disposed about a rotational axis (x) shown in FIG. 10 and having an outer periphery (lop) disposed radially outwardly from the rotational axis (a). A plurality of waves (10w) are formed in the blade (10) by deviating the entire outer periphery (10p) of the variable wave coulter (10) from a flat plane. A plurality of crests (10c) and a plurality of valleys (10v) are formed in the blade, wherein each of said plurality of waves (10w) comprises a first and a second crest (10c) and one valley (10v) between the first and second crests (10c) at the outer periphery (10p) thereof.

Figure 3:
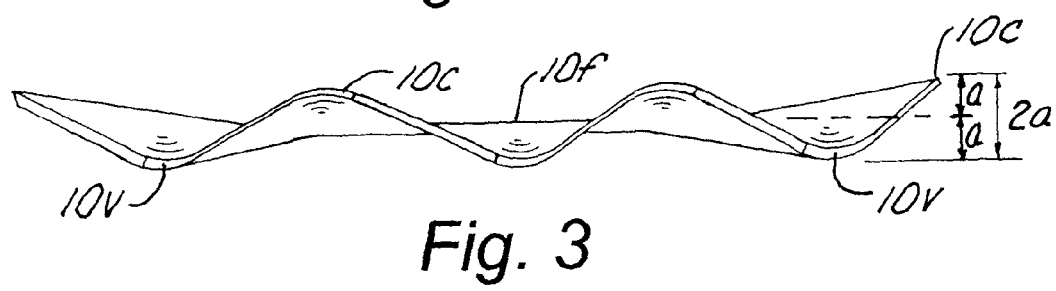
FIG. 3 is an end view of the blade of FIG. 1.
Figure 4:
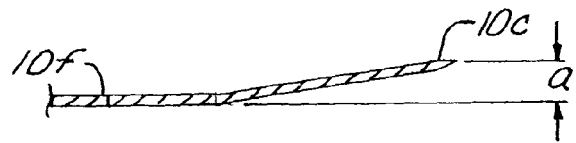
FIG. 4 is a partial cross sectional view taken along line 4-4 of FIG. 1.
Figure 5:
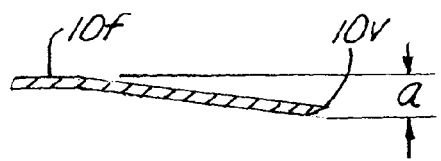
FIG. 5 is a partial cross sectional view taken along line 5-5 of FIG. 1.

The waves (10w) have a plurality of distinct amplitudes (a) as shown in FIGS. 3, 4 and 5, wherein at least one of said plurality of waves (10w) exhibits a maximum deviation (a) of each of the plurality of distinct amplitudes (a) from the flat plane (10f) at the outer periphery (10p) thereof.

A notch (10n) is disposed in each respective wave (10w) on the outer periphery (10p) of the blade (10) so that a radius (Rmin) of the blade (10) from the rotational axis (x) to the outer periphery (10p) of the blade at the notch (10n) is less than a radius (Rmax) taken on the blade at an outer periphery (10p) where there is no notch (10n), and wherein at least a majority of the notch (10mn) is disposed between the first one of the respective crests (10c) and the respective valley (10c), such majority (10mn) of the notch (10n) is closer to the first respective crest (10c) than to the second respective crest (10c).

Figure 2:
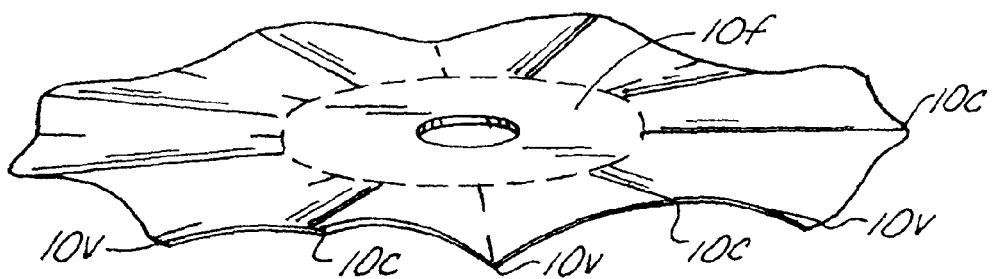
FIG. 2 is a perspective view of the blade of FIG. 1.

FIG. 2 is a perspective view of the blade (10) of FIG. 1. FIG. 3 is an end view of the blade (10) of FIG. 1 showing double amplitude (2a), meaning that twice the amplitude from flat (101).

FIG. 4 is a partial cross sectional view taken along line 4-4 of FIG. 1, showing amplitude (a) between flat at (101) and a crest (10c), which is half of the double amplitude (2a) in FIG. 3.

FIG. 5 is a partial cross sectional view taken along line 5-5 of FIG. 1, showing amplitude (a) between flat at (101) and a valley (10v), which is half of the double amplitude (2a) in FIG. 3.

Figure 6:
FIG. 6 is a partial cross sectional view taken along line 6-6 of FIG. 1.

FIG. 6 is a partial cross sectional view taken along line 6-6 of the notch (10n) of FIG. 1 showing that only one side of the notch is sharpened, though both sides of the notch (10n) could be sharpened if desired.

Figure 7:
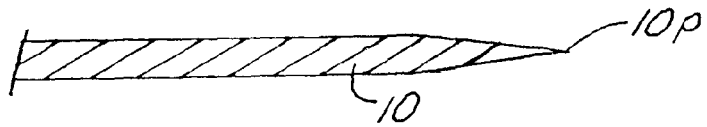
FIG. 7 is a partial cross sectional view taken along line 7-7 of FIG. 1.

FIG. 7 is a partial cross sectional view taken along line 7-7 of FIG. 1 showing that both sides of the blade at the outer periphery (lop) between the notches (10n) are sharpened, though it is only necessary to sharpen one side.

Figure 8:
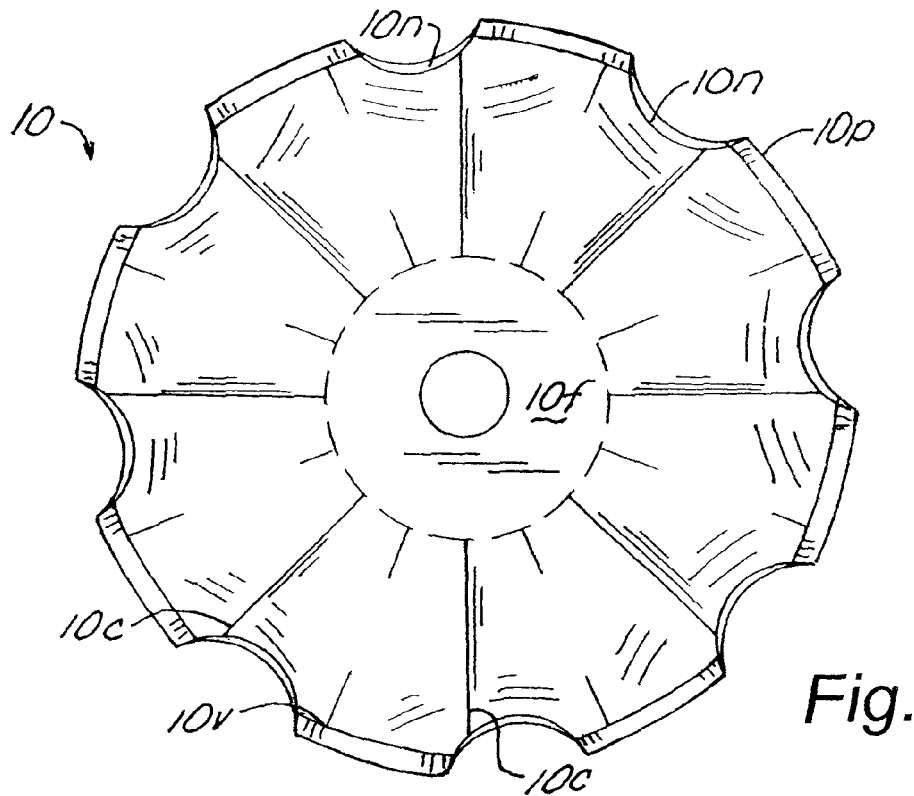
FIG. 8 is a side elevational view of the other side of the tillage blade from that shown in FIG. 1.

FIG. 8 shows the opposite side of the blade (10p) of FIG. 1 so what is shown as a valley (10v) in FIG. 1 is a crest (10c) in FIG. 8 and vice versa, so it is important to remember this when comparing the crests (10c) and valleys (10v) of FIGS. 1 and 8.

FIG. 9 shows the same side of the blade (10) of FIG. 1 in one use thereof (opposite to FIGS. 11 and 12) wherein the blade is pulled to the right as shown in FIG. 9 along the arrow with "Travel" above it and rotated clockwise as viewed in FIG. 9. In this use there will be better soil penetration because the notches (10n) will catch the stalks and cut through the stalks and dirt better since the edge of notch (10n) that enters the soil first follows a valley (10v). FIG. 10 shows a front view of that happening.

In FIGS. 9 and 10 the major part (10 nm) of the notch (10n) follows the crest (10c) by a distance (10cn). The maximum radius (Rmax) has a longer lever arm for cutting than does minimum radius (Rmin). The distance between the leading part of the notch (10n) and the trailing part of the notch (10n) is distance (10nd).

Figure 11:
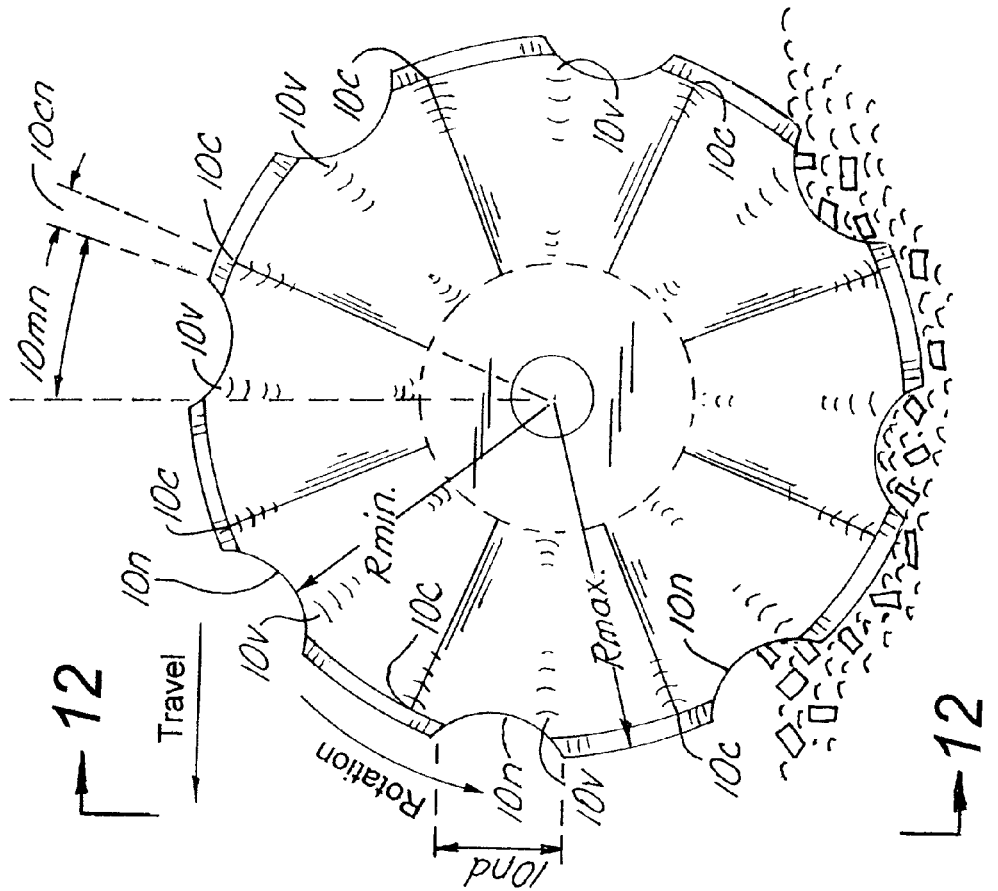
FIG. 11 is a side elevational view of one side of the tillage blade shown in FIG. 1 in use tilling the soil by pulling it through the soil in a direction opposite to the direction shown in FIG. 9, which direction of FIG. 11 provides better mixing of dirt with plant stalks than if it was pulled through the soil in an opposite direction like that shown in FIGS. 9 and 10.
Figure 12:
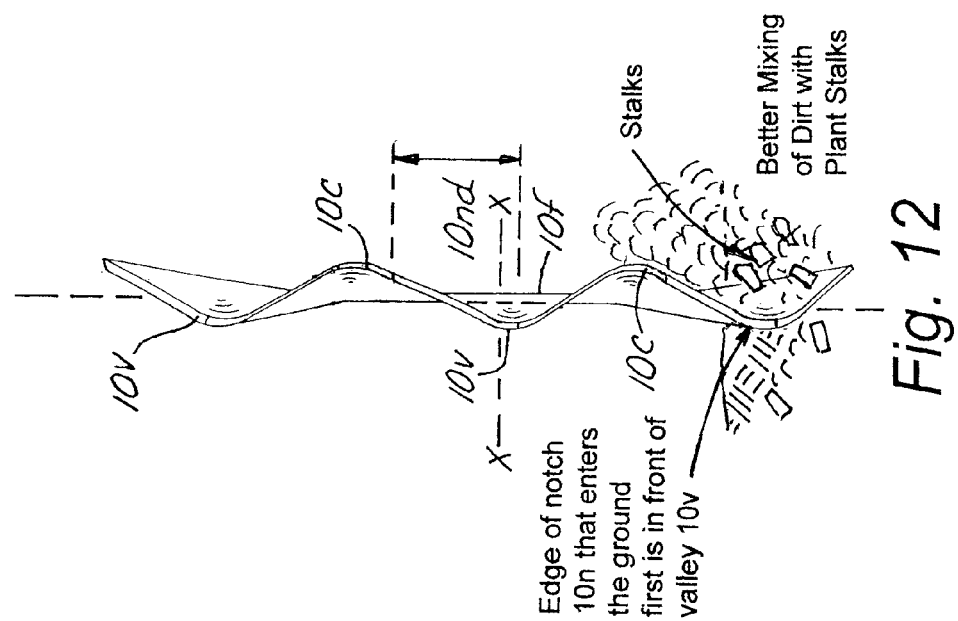
FIG. 12 is an end view taken along line 12-12 of the blade of FIG. 11 in use.

FIG. 11 shows the same side of the blade (10p) as shown in FIG. 1 in another use thereof (opposite to FIGS. 9 and 10) wherein the blade is pulled to the left as shown in FIG. 11 along the arrow with "Travel" above it and rotated counterclockwise as viewed in FIG. 11. In this use there will be better mixing of dirt or soil with the plant stalks because the crests (10c) will tend to push the stalks down in the front of the blade and pull up the dirt and the stalks as the rear of the blade (10) exits the soil. FIG. 12 is a cross sectional view along lines 12-12 of FIG. 11 that shows that happening.

In FIGS. 11 and 12 the major part (10mn) of the notch (10n) leads the crest (10c) by a distance (10cn). The maximum radius (Rmax) has a longer lever arm for cutting than does minimum radius (Rmin). The distance between the leading part of the notch (10n) and the trailing part of the notch (10n) is distance (10nd).

Figure 13:
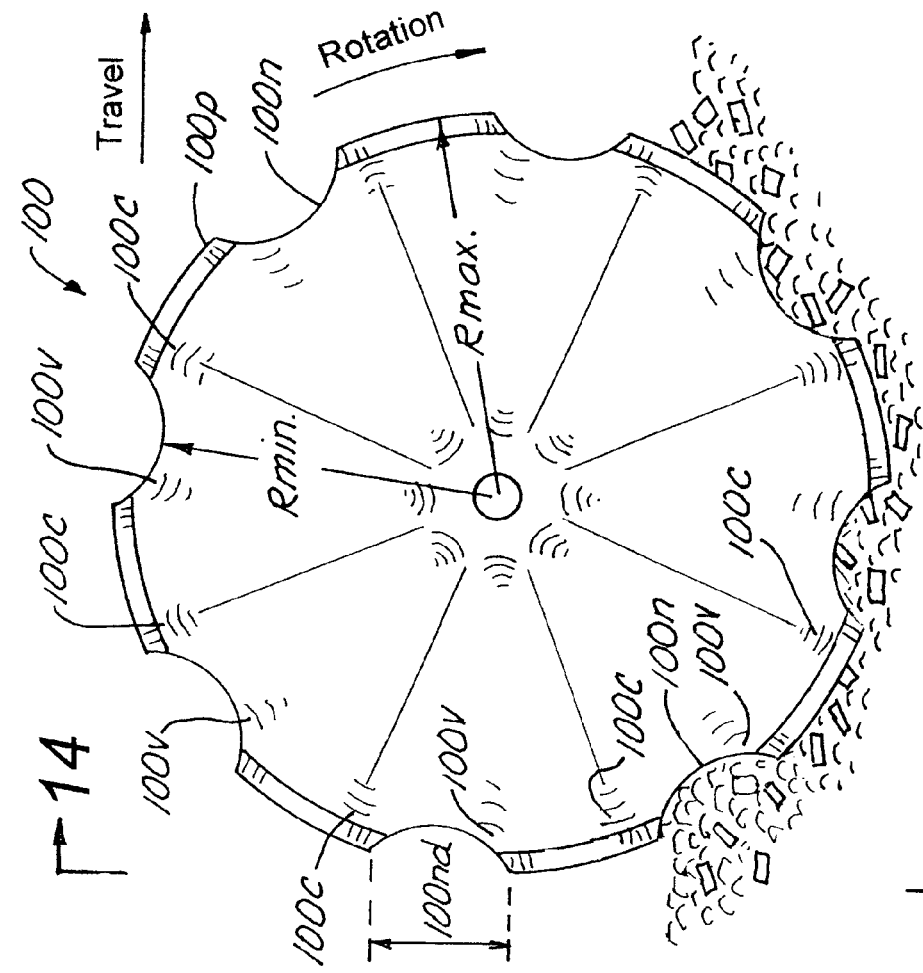
FIG. 13 is a side elevational view of one side of a disc type tillage blade with a concave/convex shape (but otherwise like the wavy coulter with notches shown in FIG. 1) in use tilling the soil by pulling it through the soil in a direction to provide better soil penetration than if it was pulled through the soil in an opposite direction like that shown in FIGS. 15 and 16.
Figure 14:
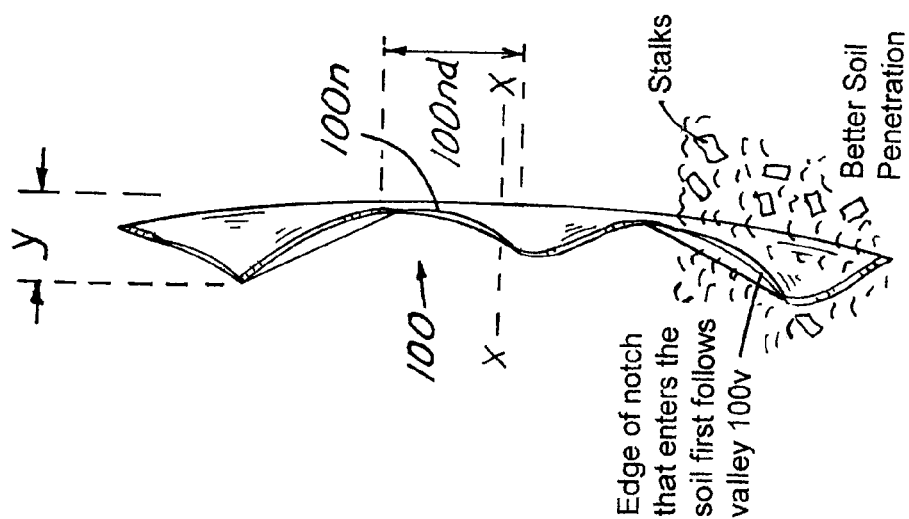
FIG. 14 is an end view taken along line 14-14 of FIG. 13 in use.
Figure 16:
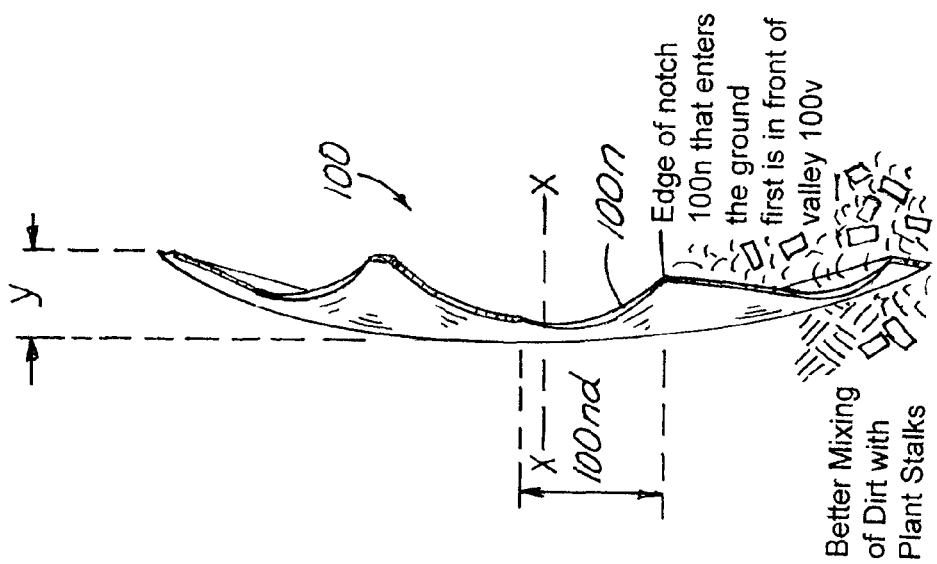
FIG. 16 is an end view taken along line 16-16 of FIG. 15 in use.
Figure 15:
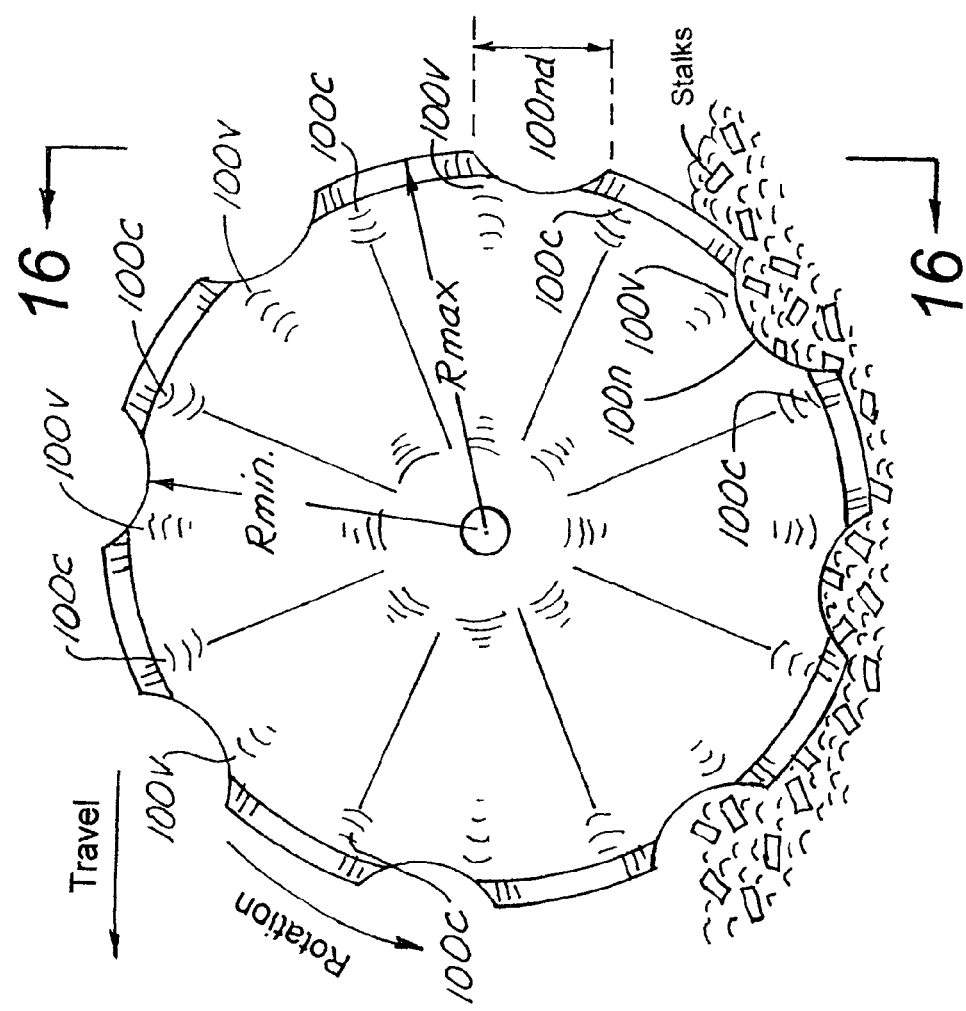
FIG. 15 is a side elevational view of one side of a disc type tillage blade with a concave/convex shape (but otherwise like the wavy coulter with notches shown in FIG. 1) in use tilling the soil by pulling it through the soil in a direction to provide better mixing of dirt with plant stalks than if it was pulled through the soil in an opposite direction like that shown in FIGS. 13 and 14.

FIG. 13 is a side elevational view of one side of a disc type tillage blade with a concave/convex shape (but otherwise like the wavy coulter with notches shown in FIG. 1) in use tilling the soil by pulling it through the soil in a clockwise direction as shown in FIG. 13 to provide better soil penetration than if it was pulled through the soil in an opposite direction like that shown in FIGS. 15 and 16. This view in FIG. 14 if compared to FIG. 9 is very similar except FIG. 9 shows the coulter (10) instead of a concave/convex disc (100) as in FIGS. 13 and 14. FIG. 13 shows the same side of the blade (100) as in FIGS. 15 and 16, but in FIGS. 13 and 14 the blade is pulled to the right as shown in FIG. 13 along the arrow with "Travel" above it and rotated clockwise as viewed in FIG. 13 instead of being pulled to the left and rotated counterclockwise as shown in FIGS. 15 and 16. In this use of FIGS. 13 and 14 there will be better soil penetration because the notches (100n) will catch the stalks and cut through the stalks and dirt better. FIG. 16 shows a rear view of that happening. Note crests (100c) and valleys (100v), rotational axis (x), distance (y) and distance (100nd) of notch (100n) in FIGS. 13-16.

FIG. 14 is an end view taken along line 14-14 of FIG. 13 in use, showing the distance "y" between one side of the disc approximately at the axis of rotation and the extreme other side of the disc measured along the axis (x) of rotation as seen in FIG. 14.

The blade (100) is being pulled to the left and rotated counterclockwise in FIGS. 15 and 16. In this use of the blade (100) there is better mixing of the dirt with plant stalks than in the use depicted in FIGS. 13 and 14 used for better soil penetration.

Figure 17:
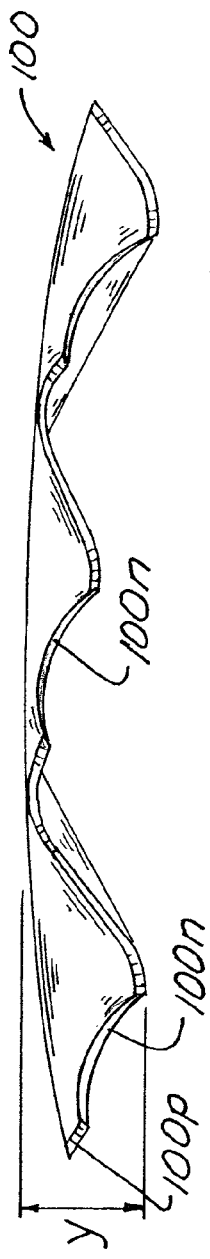
FIG. 17 is a top view of the wavy disc type tillage blade with notches of FIGS. 13-16.
Figure 18:
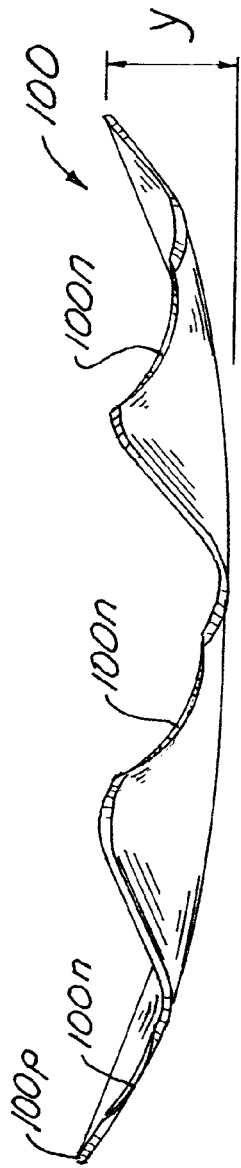
FIG. 18 is a bottom view of the wavy disc type tillage blade with notches of FIGS. 13-16.
Figure 19:
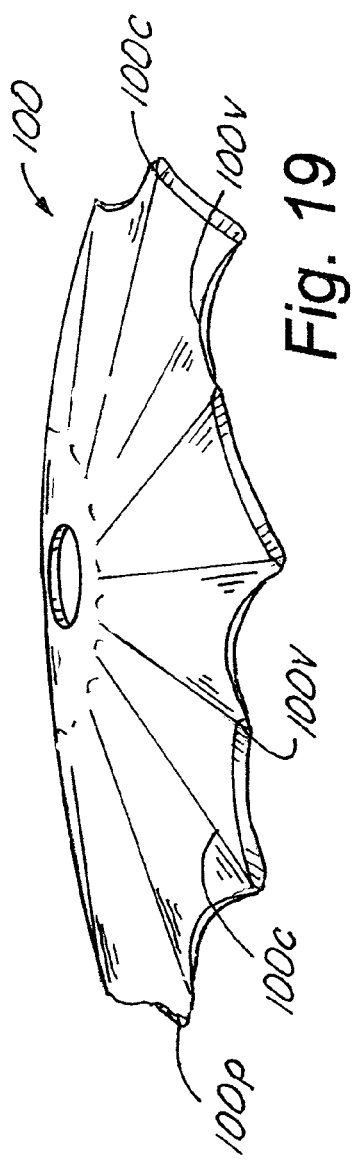
FIG. 19 is a perspective view of the blade of FIGS. 13-18.

FIG. 16 is an end view taken along line 16-16 of FIG. 15 in use. FIG. 17 is a top view of the wavy disc type tillage blade with notches of FIGS. 13-16. FIG. 18 is a bottom view of the wavy disc type tillage blade with notches of FIGS. 13-16 and FIG. 19 is a perspective view of the blade of FIGS. 13-18 showing the crests (100c), the valleys (100v), the notches (100n) and the outer periphery (100p), all of which are similar to respective corresponding elements (10c, 10v, 10n and 10p) in FIGS. 1-12 for the coulter blade (10).

Obviously many modifications and variations of the present invention are possible in light of the above teachings.

It is therefore to be understood that, within the scope of the appended claims, the invention may be practiced otherwise than as specifically described.

The invention claimed is:

1. A tillage blade comprising:
(a) a blade disposed about a rotational axis and having an outer periphery disposed radially outwardly from the rotational axis;
(b) a plurality of waves formed by deviating the entire outer periphery of the blade from a flat plane;
(c) a plurality of crests and a plurality of valleys, wherein each of said plurality of waves comprises a first and a second crest and one valley between the first and second crests at the outer periphery thereof;
(d) a plurality of amplitudes, wherein at least one of said plurality of waves exhibits a maximum deviation of each of the plurality of amplitudes from the flat plane at the outer periphery thereof; and
(e) a notch being disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest, the notch being formed about a radius that is located radially outwardly from the outer periphery of the blade, the outer periphery where there is no notch is disposed between adjacent notches and wherein there is only one notch between adjacent crests.

2. The tillage blade of claim 1 wherein each wave extends from one valley to a second adjacent valley through one crest and wherein the blade contains substantially all identical waves.

3. The tillage blade of claim 1 wherein a part of the blade closest to the axis compared to a portion of the blade at the outer periphery thereof is displaced along the axis by a predetermined amount.

4. A method of using a tillage blade of a type comprising:
(a) a blade disposed about a rotational axis and having an outer periphery disposed radially outwardly from the rotational axis;
(b) a plurality of waves formed by deviating the entire outer periphery of the blade from a flat plane;
(c) a plurality of crests and a plurality of valleys, wherein each of said plurality of waves comprises a first and a second crest and one valley between the first and second crests at the outer periphery thereof;
(d) a plurality of amplitudes, wherein at least one of said plurality of waves exhibits a maximum deviation of each of the plurality of amplitudes from the flat plane at the outer periphery thereof; and
(e) a notch being disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest, the notch being formed about a radius that is located radially outwardly from the outer periphery of the blade, the outer periphery where there is no notch is disposed between adjacent notches and wherein there is only one notch between adjacent crests;
said method comprising:
rotating the blade about the rotational axis in one rotational direction while pulling the blade at the rotational axis in a forward direction through soil to be tilled whereby in a respective wave of a leading crest and a following crest with one valley between the leading and following crest, the respective notch therein is closer to the leading crest than to the following crest.

5. A method of using a tillage blade of a type comprising:
(a) a blade disposed about a rotational axis and having an outer periphery disposed radially outwardly from the rotational axis;
(b) a plurality of waves formed by deviating the entire outer periphery of the blade from a flat plane;
(c) a plurality of crests and a plurality of valleys, wherein each of said plurality of waves comprises a first and a second crest and one valley between the first and second crests at the outer periphery thereof;
(d) a plurality of amplitudes, wherein at least one of said plurality of waves exhibits a maximum deviation of each of the plurality of amplitudes from the flat plane at the outer periphery thereof; and
(e) a notch being disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest, the notch being formed about a radius that is located radially outwardly from the outer periphery of the blade, the outer periphery where there is no notch is disposed between adjacent notches and wherein there is only one notch between adjacent crests;
said method comprising:
rotating the blade about the rotational axis in one rotational direction while pulling the blade at the rotational axis in a forward direction through soil to be tilled whereby in a respective wave of a leading crest and a following crest with one valley between the leading and following crest the respective notch therein is closer to the following crest than to the leading crest.

6. A method of using a tillage blade of a type comprising:
(a) a blade disposed about a rotational axis and having an outer periphery disposed radially outwardly from the rotational axis;
(b) a plurality of waves formed by deviating the entire outer periphery of the blade from a flat plane;
(c) a plurality of crests and a plurality of valleys, wherein each of said plurality of waves comprises a first and a second crest and one valley between the first and second crests at the outer periphery thereof;
(d) a plurality of amplitudes, wherein at least one of said plurality of waves exhibits a maximum deviation of each of the plurality of amplitudes from the flat plane at the outer periphery thereof;
(e) a notch being disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest, the notch being formed about a radius that is located radially outwardly from the outer periphery of the blade, the outer periphery where there is no notch is disposed between adjacent notches and wherein there is only one notch between adjacent crests; and (f) wherein a part of the blade closest to the axis compared to a portion of the blade at the outer periphery thereof is displaced along the axis by a predetermined amount;

said method comprising:

rotating the blade about the rotational axis in one rotational direction while pulling the blade at the rotational axis in a forward direction through soil to be tilled whereby in a respective wave of a leading crest and a following crest with one valley between the leading and following crest, the respective notch therein is closer to the leading crest than to the following crest.

7. A method of using a tillage blade of a type comprising:

(a) a blade disposed about a rotational axis and having an outer periphery disposed radially outwardly from the rotational axis;

(b) a plurality of waves formed by deviating the entire outer periphery of the blade from a flat plane;

(c) a plurality of crests and a plurality of valleys, wherein each of said plurality of waves comprises a first and a second crest and one valley between the first and second crests at the outer periphery thereof;

(d) a plurality of amplitudes, wherein at least one of said plurality of waves exhibits a maximum deviation of each of the plurality of amplitudes from the flat plane at the outer periphery thereof;

(e) a notch being disposed in each respective wave on the outer periphery of the blade so that a radius of the blade from the rotational axis to the outer periphery of the blade at the notch is less than a radius taken on the blade at an outer periphery where there is no notch, and wherein at least a majority of the notch is disposed between the first one of the respective crests and the respective valley, such majority of the notch being closer to the first respective crest than to the second respective crest, the notch being formed about a radius that is located radially outwardly from the outer periphery of the blade, the outer periphery where there is no notch is disposed between adjacent notches and wherein there is only one notch between adjacent crests; and (f) wherein a part of the blade closest to the axis compared to a portion of the blade at the outer periphery thereof is displaced along the axis by a predetermined amount;

said method comprising:

rotating the blade about the rotational axis in one rotational direction while pulling the blade at the rotational axis in a forward direction through soil to be tilled whereby in a respective wave of a leading crest and a following crest with one valley between the leading and following crest, the respective notch therein is closer to the following crest than to the leading crest.

\* \* \* \* \*